United States Patent
Chang et al.

(10) Patent No.: US 10,796,060 B2
(45) Date of Patent: *Oct. 6, 2020

(54) METHOD AND SYSTEM FOR PIN LAYOUT

(71) Applicant: TAIWAN SEMICONDUCTOR MANUFACTURING COMPANY LTD., Hsinchu (TW)

(72) Inventors: Fong-Yuan Chang, Hsinchu County (TW); Li-Chun Tien, Tainan (TW); Shun-Li Chen, Tainan (TW); Ya-Chi Chou, Hsinchu (TW); Ting-Wei Chiang, New Taipei (TW); Po-Hsiang Huang, Tainan (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,838

(22) Filed: Apr. 17, 2019

(65) Prior Publication Data

US 2019/0243940 A1 Aug. 8, 2019

Related U.S. Application Data

(63) Continuation of application No. 15/605,189, filed on May 25, 2017, now Pat. No. 10,268,796.

(60) Provisional application No. 62/395,262, filed on Sep. 15, 2016.

(51) Int. Cl.
*G06F 30/394* (2020.01)
*G06F 30/392* (2020.01)
*G06F 30/398* (2020.01)
*G06F 119/18* (2020.01)

(52) U.S. Cl.
CPC .......... *G06F 30/394* (2020.01); *G06F 30/392* (2020.01); *G06F 30/398* (2020.01); *G06F 2119/18* (2020.01)

(58) Field of Classification Search
CPC ..... G06F 30/394; G06F 30/392; G06F 30/398
See application file for complete search history.

(56) References Cited

U.S. PATENT DOCUMENTS

| | | | | |
|---|---|---|---|---|
| 8,418,113 | B1 * | 4/2013 | Alpert | G06F 30/394 |
| | | | | 716/129 |
| 8,904,335 | B2 * | 12/2014 | Yoshida | G06F 30/398 |
| | | | | 716/136 |
| 10,268,796 | B2 * | 4/2019 | Chang | G06F 30/394 |
| 10,515,177 | B1 * | 12/2019 | Ruehl | G06F 30/00 |
| 2005/0273747 | A1 * | 12/2005 | Malhotra | G06F 30/394 |
| | | | | 716/129 |

(Continued)

*Primary Examiner* — Stacy Whitmore
(74) *Attorney, Agent, or Firm* — WPAT, P.C., Intellectual Property Attorneys; Anthony King

(57) ABSTRACT

A computer readable storage medium encoded with program instructions, wherein, when the program instructions is executed by at least one processor, the at least one processor performs a method. The method includes selecting a cell, determining whether a pin has an area smaller than a predetermined area, allowing a pin access of the pin to extend in a corresponding patterning track of the pin access when the pin access when the pin is determined to be having an area smaller than the predetermined threshold, and causing an integrated circuit to be fabricated according to the pin.

20 Claims, 9 Drawing Sheets

(56) References Cited

U.S. PATENT DOCUMENTS

| | | | | |
|---|---|---|---|---|
| 2005/0273748 A1* | 12/2005 | Hetzel | .................... | G06F 30/394 |
| | | | | 716/130 |
| 2009/0064081 A1* | 3/2009 | Berry | .................... | G06F 30/394 |
| | | | | 716/130 |
| 2012/0110539 A1* | 5/2012 | Birch | .................... | G06F 30/394 |
| | | | | 716/130 |
| 2013/0086544 A1* | 4/2013 | Alpert | .................... | G06F 30/394 |
| | | | | 716/129 |
| 2014/0289695 A1* | 9/2014 | Yoshida | ................ | G06F 30/398 |
| | | | | 716/136 |
| 2014/0353842 A1* | 12/2014 | Yuan | .................... | H01L 23/5226 |
| | | | | 257/774 |
| 2015/0143309 A1* | 5/2015 | De Dood | .............. | G06F 30/398 |
| | | | | 716/107 |
| 2015/0331988 A1* | 11/2015 | Yuan | .................... | H01L 23/5226 |
| | | | | 257/774 |

* cited by examiner

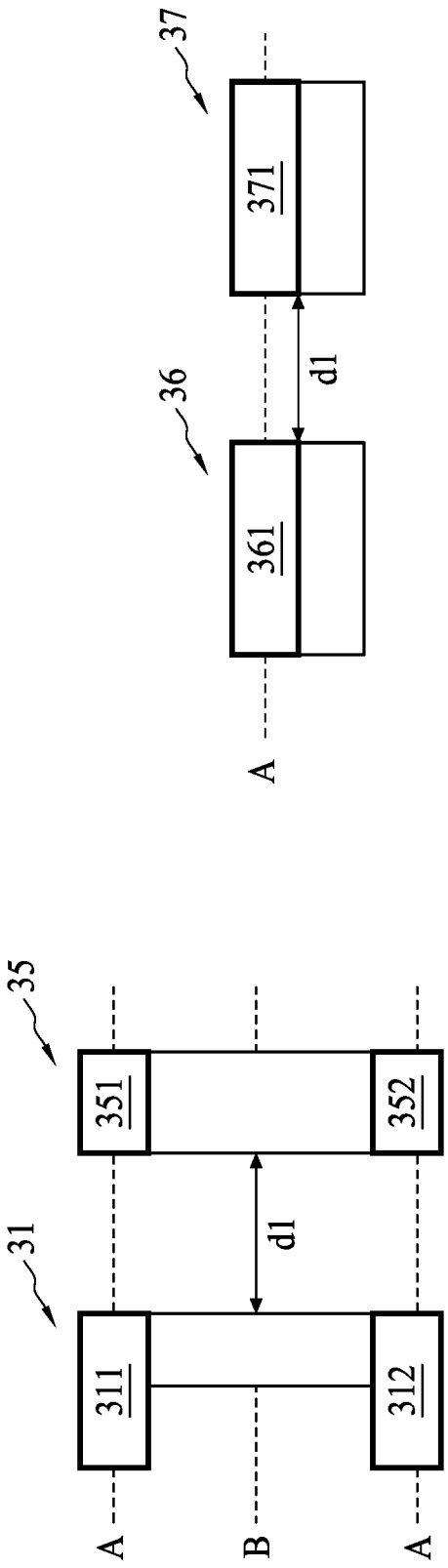

METHOD AND SYSTEM FOR PIN LAYOUT

CROSS REFERENCE TO RELATED APPLICATIONS

This application is a continuation of U.S. patent application Ser. No. 15/605,189, entitled "METHOD AND SYSTEM FOR PIN LAYOUT" filed on May 25, 2017, claims the benefit of U.S. provisional application Ser. No. 62/395,262, filed on Sep. 15, 2016, which is incorporated by reference in its entirety.

BACKGROUND

In the semiconductor industry, with continual scaling of feature size and increasingly expanding functionalities of chips, the critical pitch in a semiconductor chip is also reduced. To fabricate such a small critical pitch, a large number of photomasks, or more simply masks, are required during the fabrication. Multi-patterning or multiple patterning technology for photolithography has been developed to enhance feature density in an integrated circuit (IC). While multi-patterning technology facilitates fabrication of device features, pin accessibility may be adversely affected and thus become a challenge in layout design.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A and 3B are schematic diagrams of pin layouts in accordance with some embodiments.

DETAILED DESCRIPTION

Figure 1:
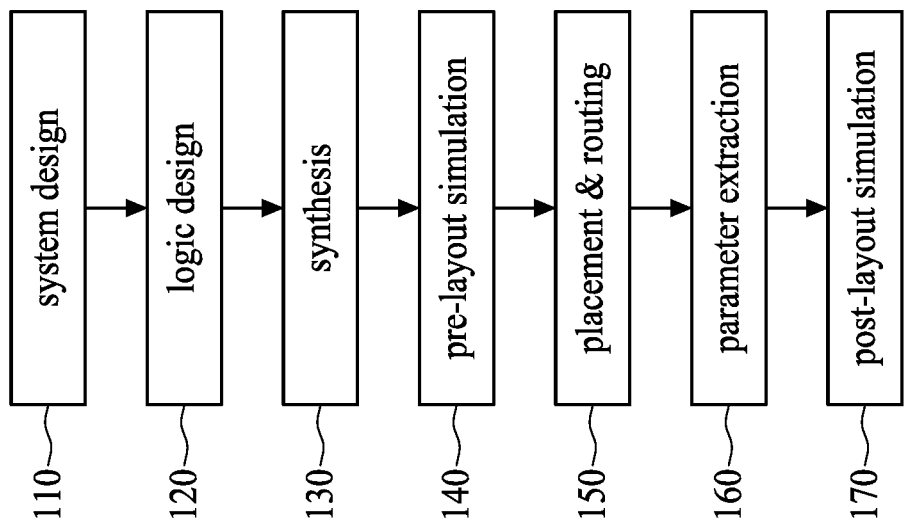
FIG. 1 is a schematic diagram illustrating a design flow in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic diagram illustrating a design flow 100 in accordance with some embodiments. The design flow 100 facilitates fabrication of an IC. In the process of fabricating an IC, the multi-patterning technology may overcome the distortion or deviation on the geometric physical layout when the layout is lithographed by a single mask having a high density of patterns. Further, the multi-patterning technology includes a process of sequentially using a plurality of different masks, which have different patterns formed thereon, to photolithograph their different features on a layer of the substrate. Therefore, the multi-patterning technology can produce a number of desired features as compared to the single patterning technology. However, pin accessibility may be decreased due to more strict patterning rules of multi-patterning. It may therefore be desirable to have a method and system for pin layout that comply with the patterning rules of multi-patterning while maintain the relatively high pin accessibility as the single patterning. The pin layout method and system are applicable to a design flow and facilitate, for example, placement and routing in the design flow. An exemplary design flow 100 is thus introduced by referring to FIG. 1 as follows.

Referring to FIG. 1, the design flow 100, employed for designing semiconductor chips, utilizes one or more electronic design automation (EDA) tools to facilitate design operations. A workstation or personal computer is used in executing the tools to accomplish the design flow 100. The design flow 100 comprises a system design stage 110, a logic design stage 120, a synthesis stage 130, a pre-layout simulation stage 140, a placement and routing stage 150, a parameter extraction stage 160 and a post-layout simulation stage 170.

Initially, at the system design stage 110, a systematic architecture for the chip of interest is provided with a high level description. In that stage, each function of the chip along with performance requirements is determined according to a design specification. Those functions are usually represented by respective schematic functional modules or blocks. In addition, an optimization or performance trade-off may be sought in order to achieve the design specification with affordable cost and power.

At the logic design stage 120, the functional modules or blocks are described in a register transfer level (RTL) using a hardware description language. The language tools are usually available from commercial software, for example, Verilog or VHDL. A preliminary functionality check is performed at the logic design stage 120 to verify if the implemented functions conform to the specification set forth in the system design stage 110.

Subsequently, at the synthesis stage 130, the modules in RTL descriptions are converted into a netlist data where circuit structure, for example, logic gates and registers, in each function module are established. Mapping of such logic gates and registers to available cells in a standard cell library may be conducted. Further, the netlist data is offered to describe the functional relationship of the chip devices in a gate-level. The netlist data is transformed from the gate-level view to a transistor-level view. The term "netlist" used herein refers to both graphical-based representation such as a schematic and/or a text-based representation of a circuit.

Then, the gate-level netlist data is verified at the pre-layout simulation stage 140. At the verification process of the stage 140, if some of the functions fail the verification in the simulation, the design flow 100 may be paused temporarily and go back to the stages 110 or 120 for further correction or modification. After the pre-layout simulation stage 140, the IC chip design has passed a preliminary verification and completed the front-end design process. Subsequently, a back-end physical design process will follow.

At the placement and routing stage 150, a physical architecture representing the circuits determined during the front-end process is implemented. The detailed structure and associated geometry of each component and device are determined in the placement operation, and interconnects among different components are routed subsequent to the placement operation. Moreover, the placement operation involves deciding where to place each IC chip component and circuitry in a limited amount of space, and the routing operation decides the actual wiring of connecting lines. Both operations of placement and routing are performed to meet a design rule check (DRC) deck, such as from the chip manufacturing facility, so as to fulfill the manufacturing criteria of the chip. After the placement and routing stage 150, a placed-and-routed layout data is created and a netlist with placement and routing data is generated accordingly.

At the parameter extraction stage 160, a layout parameter extraction (LPE) operation is conducted to derive layout-dependent parameters, such as parasitic resistance and capacitance, resulting from a developed layout at the stage 150. In some embodiments, before the layout parameter extraction operation, a layout-versus-schematic (LVS) verification is performed to check the functional performance of the chip in terms of the placed-and-routed netlist. Consequently, a post-layout netlist data is then generated, which includes the layout-dependent parameters.

At the post-layout simulation stage 170, a physical verification is performed by taking the parameters acquired in previous stages into account. At the stage 170, a simulation of transistor-level behavior is conducted in order to examine whether the chip performs the desired functionality within the required system specification. Moreover, the post-layout simulation is performed to ensure no presence of electrical issues or lithographic issues in the chip manufacturing process.

After the post-layout simulation stage 170, it is determined whether the post-layout netlist fulfills the design specification. If affirmative, the circuit design is accepted and then signed off accordingly. However, if the result of the post-layout simulation is unfavorable, the design flow 100 would loop back to previous stages for functionality or performance tuning. For example, the design flow 100 may loop back to the placement and routing stage 150 where the layout is re-developed so as to fix issues from the layout level. Alternatively, the design flow 100 may retreat to earlier stages; either the system design stage 110 or the logic design stage 120 in order to recast the chip design in case the problems cannot be resolved in the back-end stage.

The design flow 100 illustrated in FIG. 1 is exemplary. The method and system for pin layout are applicable to the design flow 100 or other design flows including other sequences of the stages or operations, partition of the stages, or additional stages before, between or after the stages shown.

In advanced semiconductor fabrications, for example, the 10-nanometer (N10) node or beyond, multi-patterning is used to enhance device feature density. In the process of multi-patterning, pin spacing is taken into consideration to ensure patterning energy applied to one track does not interfere with that applied to another. Moreover, to ensure that one pin is spaced apart from another pin by a desired spacing, pins in a pin layout from a library such as a standard cell library are categorized into a cross-track type, a fat pin type and a short pin type, as will be further discussed below.

Figure 2A:
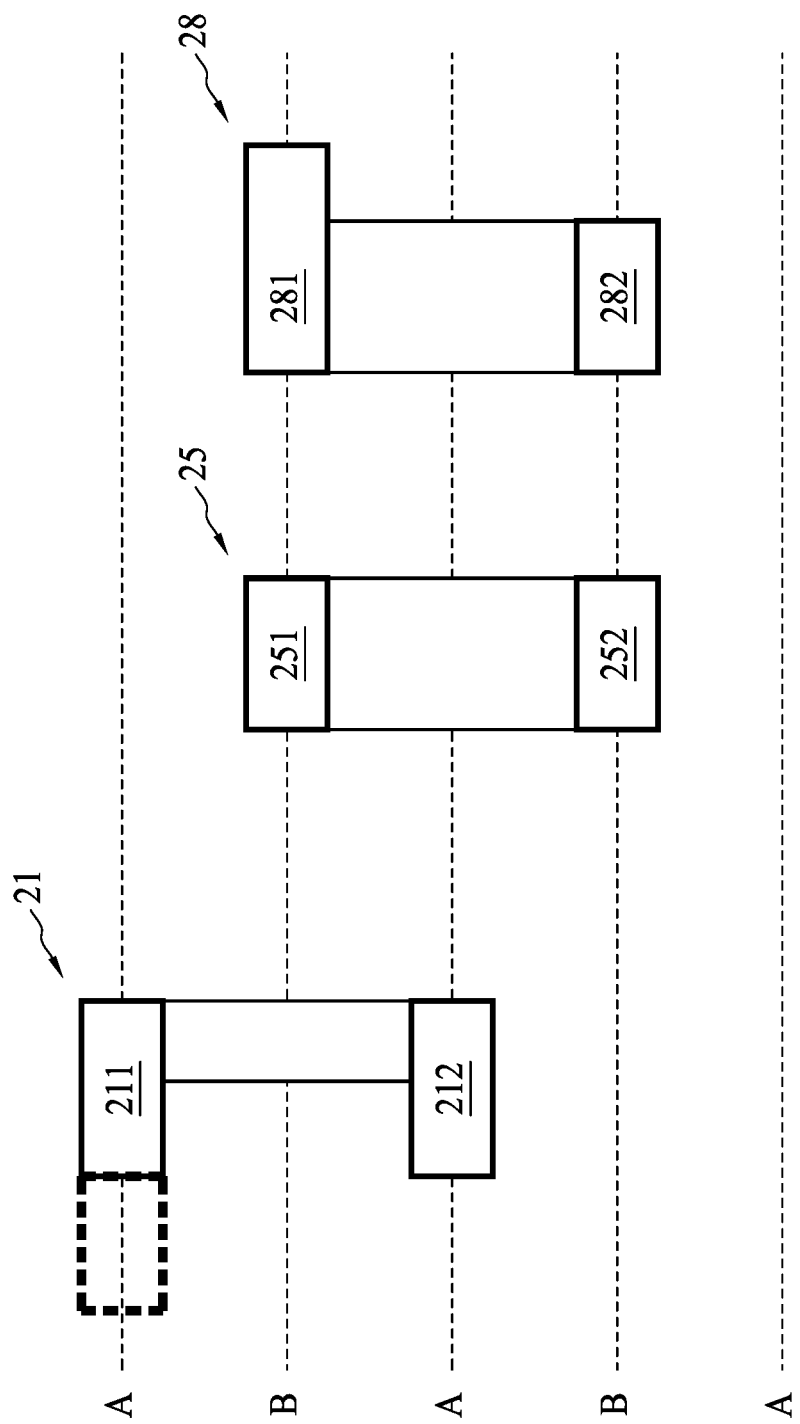
FIG. 2A is a schematic diagram of exemplary cross-track pins.

FIG. 2A is a schematic diagram of exemplary cross-track pins 21, 25 and 28. Referring to FIG. 2A, pins 21, 25 and 28 that extend across more than one patterning tracks A and B are categorized into the cross-track type. A patterning track represents a group of features which may be imaged at once during a photolithography process. With the help of EDA tools, in a layout design stage a same color is assigned to the same patterning groups. In the present embodiment, two patterning groups or patterning tracks A and B (shown in dashed lines) are shown. However, in other embodiments, more than two patterning groups or tracks such as A, B and C may be employed and fall within the contemplated scope of the present disclosure. The spacing between immediately adjacent patterning tracks A and B satisfy the requirement that no interference of patterning energy for the different tracks can occur.

The cross-track pin 21, having a reversed "C" shape, includes a first pin access 211 (shown as a box region) and a second pin access 212 (shown as a box region), where a routing wire can be connected thereto in a placement and routing process as described with reference to FIG. 1. In an embodiment according to the present disclosure, the first pin access 211 and the second pin access 212 are assigned to a same patterning group at different patterning tracks. As illustrated in FIG. 2A, the first pin access 211 and the second pin access 212 are assigned to, for example, a first patterning group at separate patterning tracks A.

The cross-track pin 25, having an "I" or bar shape, includes a first pin access 251 and a second pin access 252. Similarly, the first pin access 251 and the second pin access 252 are assigned to, for example, a second patterning group at separate patterning tracks B.

Likewise, the cross-track pin 28, having an inverted "L" shape, includes a first pin access 281 and a second pin access 282. Similarly, the first pin access 281 and the second pin access 282 are assigned to the second patterning group at separate patterning tracks B.

A cross-track pin according to the present disclosure is not limited to the reversed C, I or inverted L shape as shown, and may take other shapes such as a "C" shape or "L" shape, which also fall within the contemplated scope of the present disclosure.

In another embodiment according to the present disclosure, a cross-track pin is checked to determine whether its size is equal to or larger than a predetermined area, which may ensure a reliable connection to a wire in a placement and routing process. If not, taking the cross-track pin 21 as an example, at least one of the first pin access 211 or the second pin access 212 is extended (shown by a dashed box) along their respective tracks in the placement and routing process to increase the area of the cross-track pin 21. In an embodiment, the predetermined area is approximately 0.005 square nanometers.

Figure 2B:
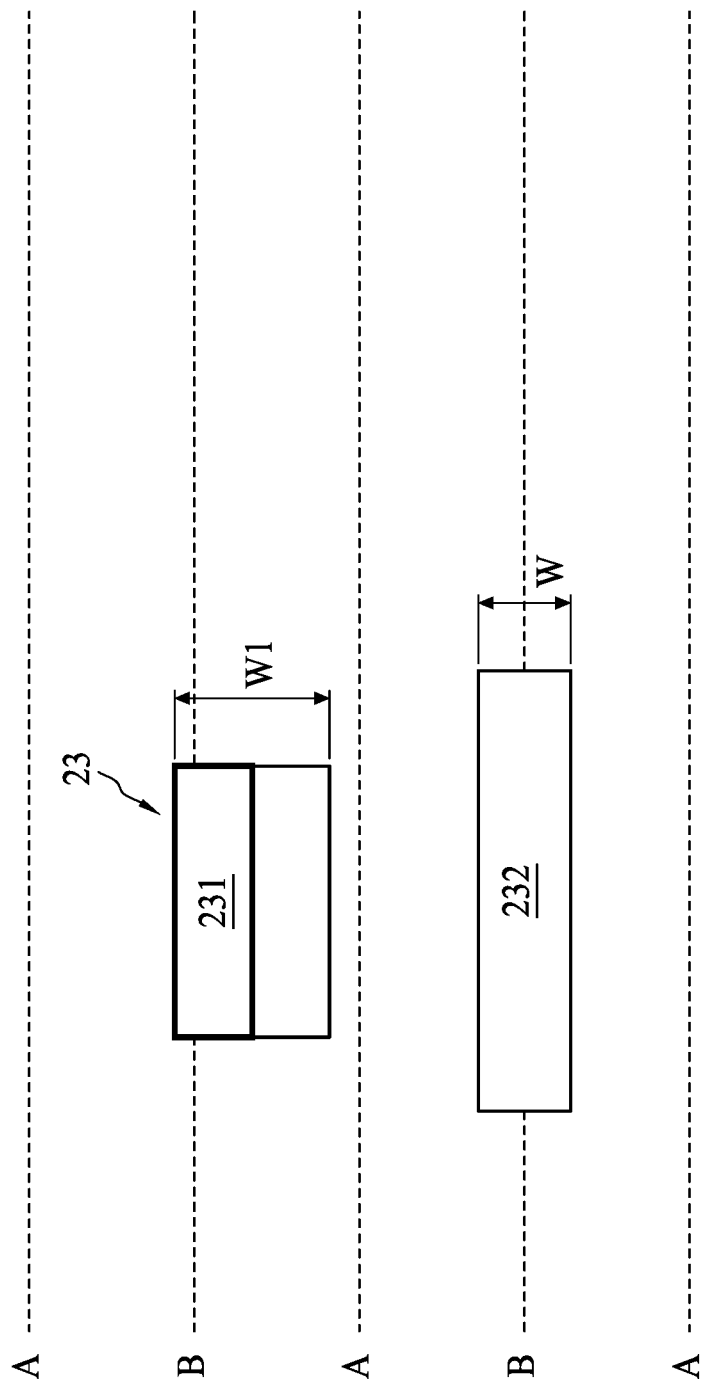
FIG. 2B is a schematic diagram of an exemplary fat pin.

FIG. 2B is a schematic diagram of an exemplary fat pin 23. A fat pin refers to one that, even though not extend across different tracks, has a width w1 larger than a normal width w, in a direction substantially orthogonal to the patterning track. The normal width is a line width that the current semiconductor manufacturing process can support. Referring to FIG. 2B, the fat pin 23 is composed of a first portion 231 that serves as a pin access, and a second portion (not numbered) that adds up the total width of the pin 23 to w1. Generally, a fat pin has an area equal to or larger than the predetermined area. Nevertheless, in a placement and routing process a wire 232 may be added to extend along a track of the same patterning group as and immediately adjacent to the track B associated with the pin access 231 of the fat pin 23. Effectively, pin accessibility of the fat pin 23 is enhanced. In an embodiment according to the present disclosure, the wire 232 has a normal width w.

Figure 2C:
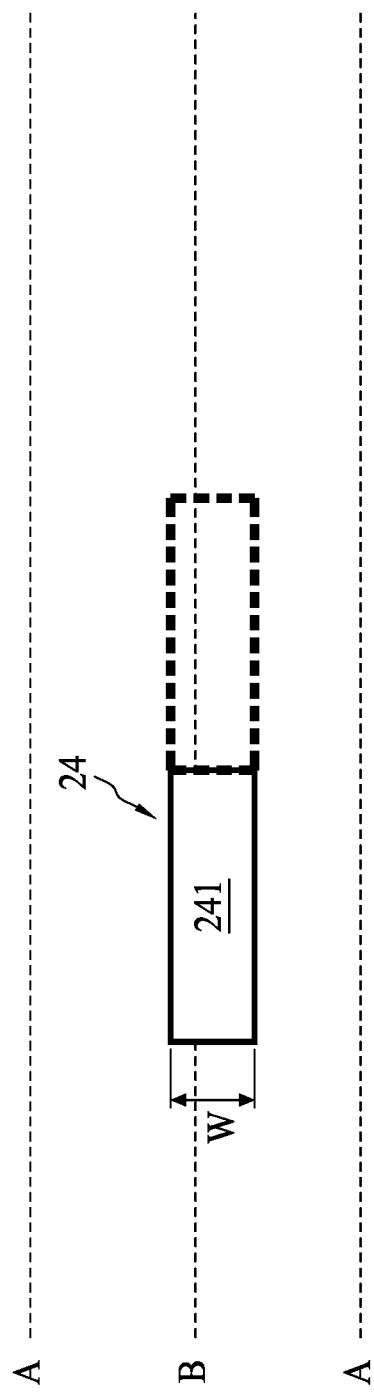
FIG. 2C is a schematic diagram of an exemplary short pin.

FIG. 2C is a schematic diagram of an exemplary short pin 24. A short pin refers to one that extends along a single patterning track and has a normal width w in a direction. Referring to FIG. 2C, the short pin 24 includes a pin access 241. Moreover, as in the case of a cross-track pin, a short pin is checked to determine whether its size is equal to or larger than the predetermined area. If not, the pin access 241 is extended (shown by a dashed box) in a placement and routing process to increase the area of the short pin 24.

FIGS. 3A and 3B are schematic diagrams of pin layouts in accordance with some embodiments. Referring to FIG. 3A, a first pin 31 selected from a cell in a library includes a first pin access 311 and a second pin access 312, which are assigned to a same patterning group at separate patterning tracks. Similarly, a second pin 35, disposed immediately adjacent to the first pin 31, includes a first pin access 351 and a second pin access 352, which are assigned to a same patterning group at separate patterning tracks. A method according to the present disclosure determines whether a pin access of a first pin is on a same patterning track as a pin access of an immediately adjacent second pin. If affirmative, the first pin and the second pin are separated from each other by a first spacing d1. If not, the first pin and the second pin are separated from each other by a second spacing d2. In the present embodiment, the first pin access 311 of the first pin 31 and the first pin access 351 of the second pin 35 fall on a same patterning track A, or the second pin access 312 of the first pin 31 and the second pin access 352 of the second pin 35 fall on another same patterning track A. As a result, the first pin 31 and the second pin 35 are separated from each other by the first spacing d1. In an embodiment, the first spacing d1 ranges from approximately 50 nanometers (nm) to 70 nm, or is approximately 60 nm.

Referring to FIG. 3B, a first pin 36 selected from a cell in a library includes a pin access 361, and a second pin 37, disposed immediately adjacent to the first pin 31, includes a pin access 371. Since the pin access 361 of the first pin 36 and the pin access 371 of the second pin 37 fall on a same patterning track A, the first pin 36 and the second pin 37 are separated from each other by the first spacing d1.

In the embodiment shown in FIG. 3A, both the first pin 31 and the second pin 35 are cross-track pins, and in the embodiment shown in FIG. 3B, both the first pin 36 and the second pin 37 are fat pins. However, the present disclosure is not limited to such exemplary embodiments. For example, in the case that a first pin is separated from a second pin by the first spacing d1, each of the first pin and the second pin may be one of a cross-track pin, a fat pin or a short pin, given that a pin access of the first pin and a pin access of the second pin are on a same patterning track.

Figure 4B:
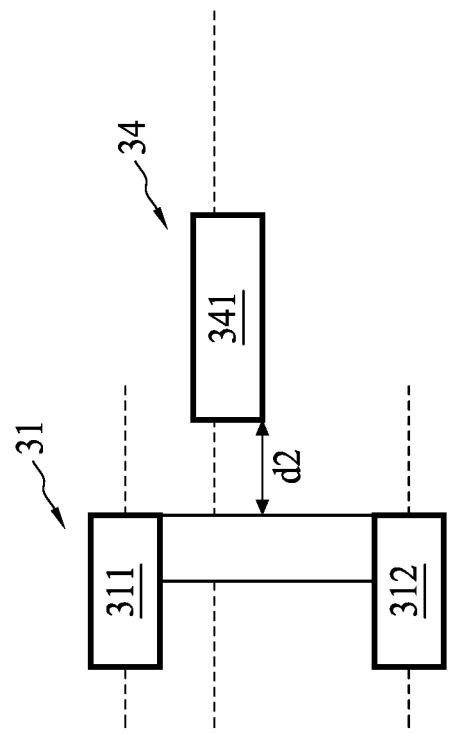
FIGS. 4A and 4B are schematic diagram of pin layouts in accordance with some embodiments.
Figure 4A:
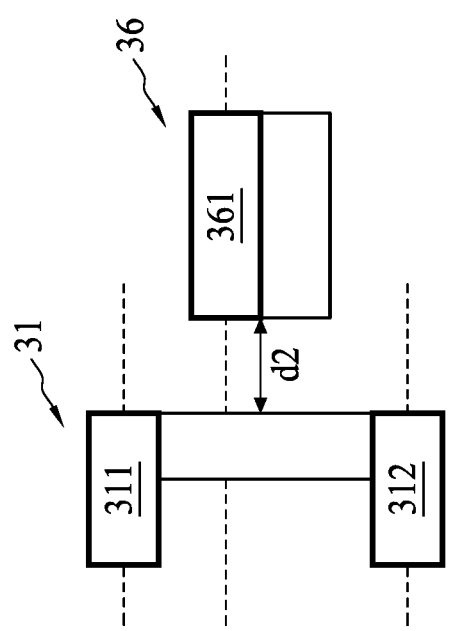

FIGS. 4A and 4B are schematic diagram of pin layouts in accordance with some embodiments. Referring to FIG. 4A, since the pin access 311 of the first pin 31 and the pin access 361 of the second pin 36 are not on a same patterning track, the first pin 31 and the second pin 36 are separated from each other by the second spacing d2. The second spacing d2 is smaller than the first spacing d1. In an embodiment, the second spacing d2 is approximately 30 nm.

Referring to FIG. 4B, likewise, since the pin access 311 of the first pin 31 and the pin access 341 of the second pin 34 are not on a same patterning track, the first pin 31 and the second pin 34 are separated from each other by the second spacing d2.

In the embodiment shown in FIG. 4A, the first pin 31 is a cross-track pin and the second pin 36 is a fat pin. Further, in the embodiment shown in FIG. 4B, the first pin 31 is a cross-track pin and the second pin 34 is a short pin. However, the present disclosure is not limited to such exemplary embodiments. For example, in the case that a first pin is separated from a second pin by the second spacing d2, each of the first pin and the second pin may be one of a cross-track pin, a fat pin or a short pin, given that a pin access of the first pin and a pin access of the second pin are on different patterning tracks.

Figure 5:
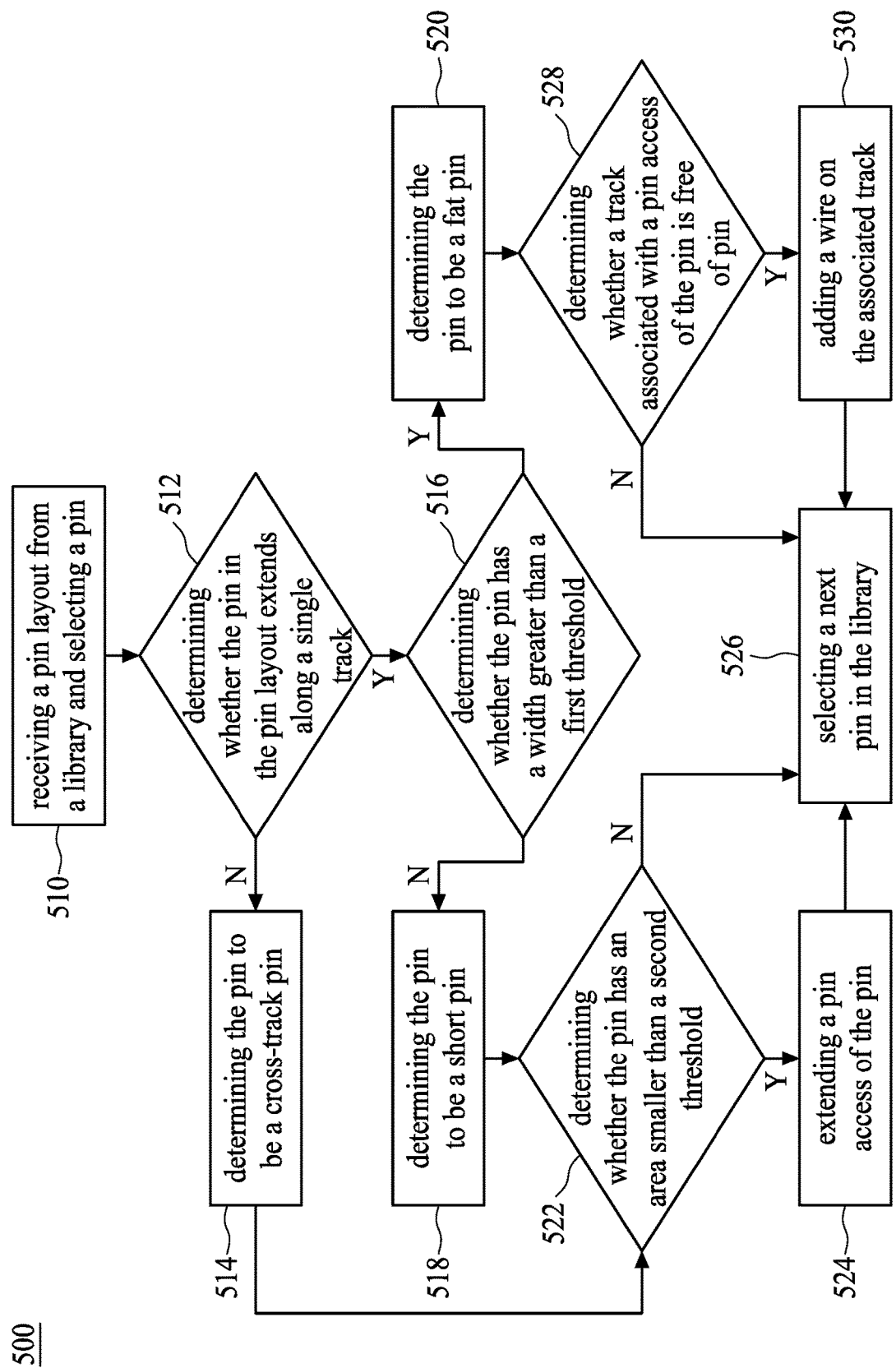
FIG. 5 is a flow diagram of a method for pin layout in accordance with an embodiment.

FIG. 5 is a flow diagram of a method 500 for pin layout in accordance with an embodiment. Referring to FIG. 5, in operation 510, a cell from a library is received and a pin in the cell is selected.

In operation 512, it is determined whether the pin in the cell extends along a single track. If not, in operation 514, the pin is determined to be a cross-track pin. If affirmative, in operation 516, it is determined whether the pin has a width larger than a first threshold, for example, a normal width as described and illustrated with reference to FIG. 2B. If not, the pin is determined to be a short pin in operation 518. If affirmative, the pin is determined to be a fat pin in operation 520.

If the pin is a cross-track pin or a short pin as determined in operation 514 or 518, respectively, then in operation 522, it is determined whether the pin has an area smaller than a second threshold, for example, a predetermined area as described and illustrated with reference to FIG. 2A or 2C. If affirmative, in operation 524 a pin access of the pin is allowed to extend along its patterning track in, for example, a placement and routing process. If not, a next pin in the pin layout is selected in operation 526 and then operation 512 is repeated.

If the pin is a fat pin as determined in operation 520, then in operation 528, it is determined whether a patterning track associated with a pin access of the fat pin is free of pin. Specifically, as described and illustrated with reference to FIG. 2B, the patterning track belongs to the same patterning group as the pin access of the fat pin and is adjacent to the patterning track of the pin access of the fat pin. If such a patterning track free of another pin exists, in operation 530, a wire is allowed to be added on the patterning track in the placement and routing process. If no such patterning track exists, then in operation 526 a next pin in the cell is selected and subsequently operation 512 is repeated.

The method described and illustrated with reference to FIG. 5 categories the pins in the cell into at least three types, i.e., cross-track pins, fat pins and short pins. Moreover, depending on the type and dimensional feature of a pin, a pin access of the pin is allowed to be extended or a wire is allowed to be added in an associated track in a placement and routing process in a design flow. Effectively, the method enhances pin accessibility of the pins in the cell. A new pin layout in accordance with the method of FIG. 5 may be generated and then stored in a library to facilitate a multi-patterning process.

Figure 6:
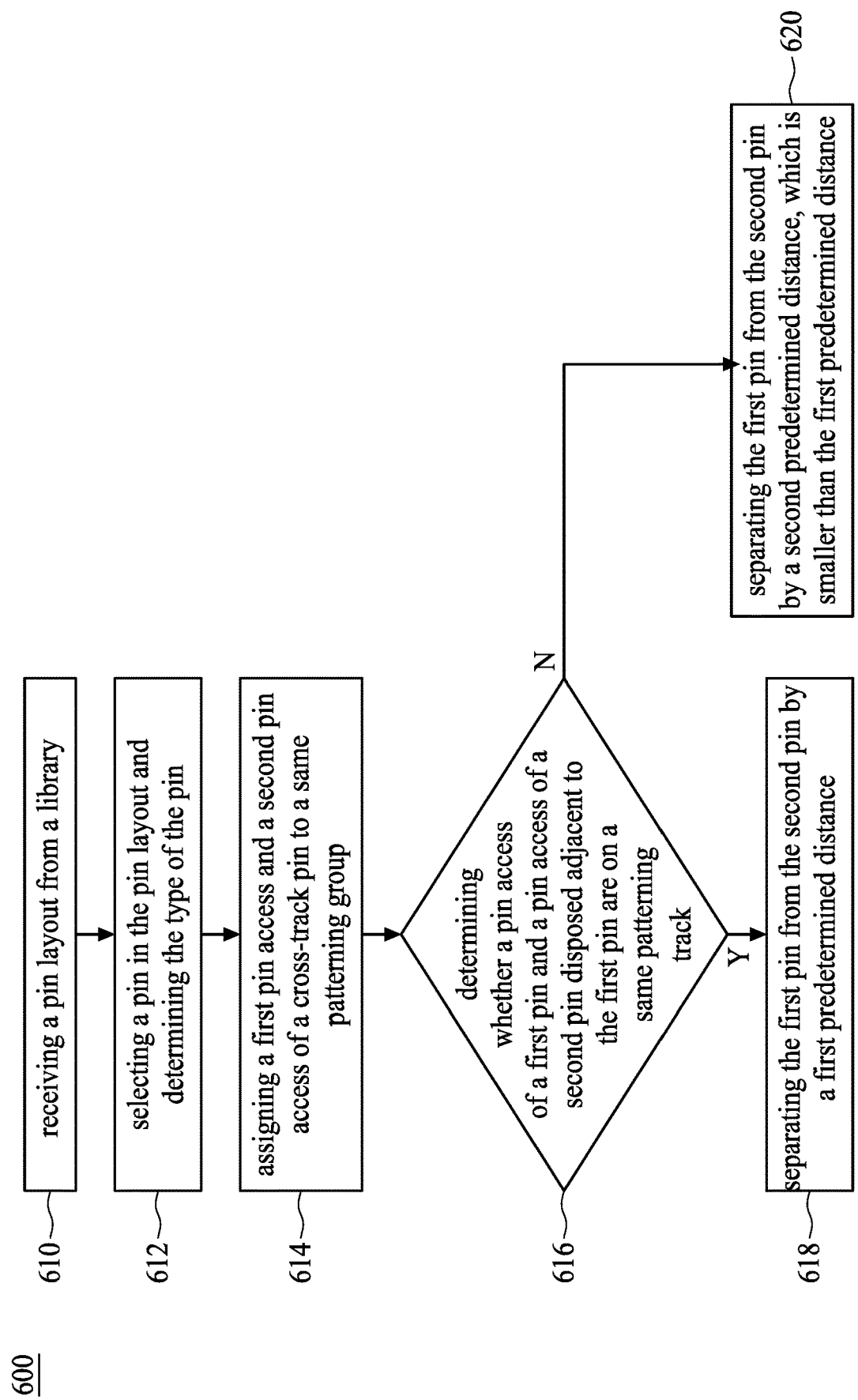
FIG. 6 is a flow diagram of a method for pin layout in accordance with another embodiment.

FIG. 6 is a flow diagram of a method 600 for pin layout in accordance with another embodiment. Referring to FIG. 6, in operation 610, a cell is received from a library such as a standard cell library.

Next, in operation 612, a pin in the pin layout is selected. Moreover, a type of the pin is determined by, for example, the operations 512 and 516 as described and illustrated with reference to FIG. 5.

In operation 614, for a cross-track pin determined in operation 612, a first pin access and a second pin access of the cross-track pin are assigned to a same patterning group at separate patterning tracks.

In operation 616, it is determined whether a pin access of a first pin and a pin access of a second pin disposed adjacent to the first pin are on a same patterning track. If affirmative, then in operation 618, the first pin and the second pin are separated from each other by a first predetermined distance or spacing. The first predetermined distance ensures no interference of patterning energy between adjacent patterning tracks. If not, in operation 620, the first pin and the second pin are separated from each other by a second predetermined distance or spacing, which is smaller than the first predetermined distance. The smaller pin spacing facilitates a more flexible pin arrangement and thus enhances pin accessibility of the pins in cell. A new pin layout in accordance with the method of FIG. 6 may be generated and then stored in a library to facilitate a multi-patterning process. Furthermore, as can be realized by persons having ordinary skill in the art, a new pin layout integrating the methods of FIGS. 5 and 6 may be generated and stored in a library.

Figure 7:
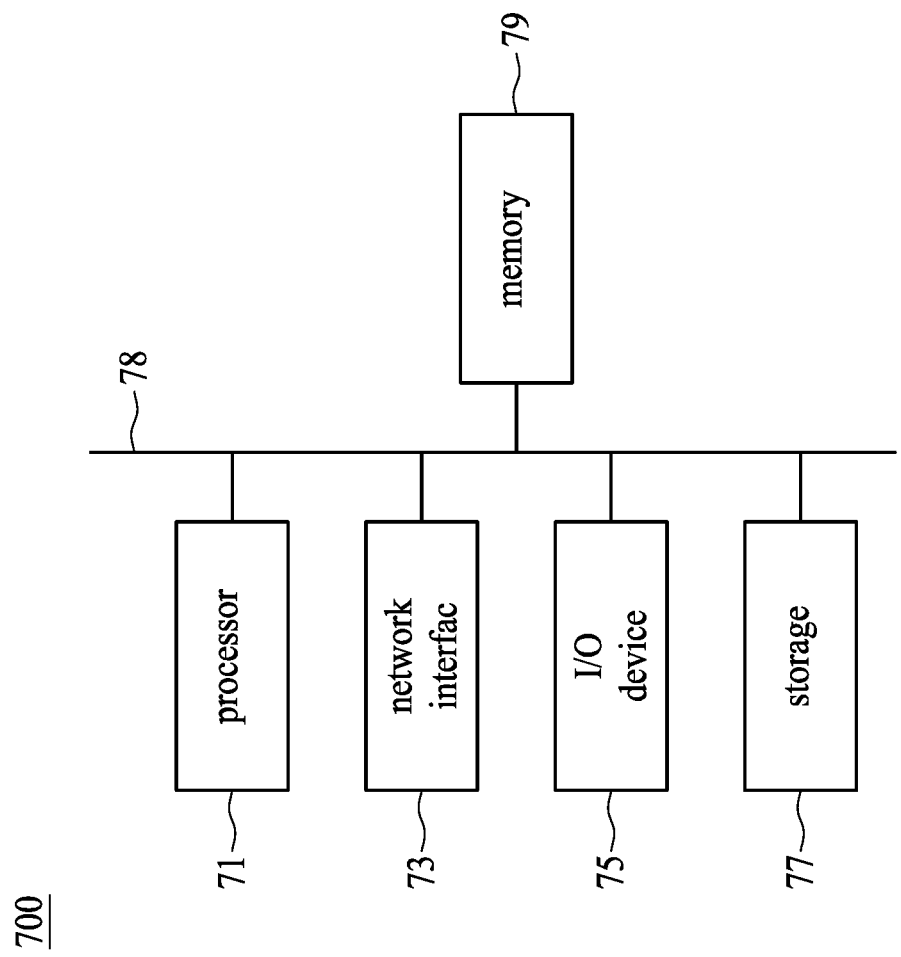
FIG. 7 is a block diagram of a system for pin layout in accordance with some embodiments.

FIG. 7 is a block diagram of a system 700 for pin layout in accordance with some embodiments. Referring to FIG. 7, the system 700 includes a processor 71, a network interface 73, an input and output (I/O) device 75, a storage 77, a memory 79, and a bus or network 78. The bus 78 couples the network interface 73, the I/O device 75, the storage 77 and the memory 79 to the processor 71.

The processor 71 is configured to execute program instructions that include a tool configured to perform a method as described and illustrated with reference to FIG. 5 or 6 or both. Accordingly, the tool is configured to execute the operations including selecting a pin in a cell, determining a type of the pin, assigning a first pin access and a second pin access of the pin to a same patterning group at different patterning tracks when the pin is determined to be a cross-track pin, determining whether a pin access of a first pin and a pin access of a second pin disposed adjacent to the first pin in the pin layout are on a same patterning track, separating the first pin and the second pin from each other by a first predetermined distance when the pin accesses are determined to not be on a same patterning track, and separating the first pin and the second pin from each other by a second predetermined distance when the pin accesses are determined to be on a same patterning track, the second predetermined distance being smaller than the first predetermined distance. Moreover, the tool is also configured to execute the operations including selecting a pin in a cell, determining a type of the pin to be one of a cross-track pin, a fat pin or a short pin, determining whether the pin has an area smaller than a predetermined area when the pin is determined to be one of a cross-track pin or a short pin, allowing a pin access of the pin to extend in its patterning track when the pin is determined to be having an area smaller than the predetermined threshold, determining whether a patterning track associated with a pin access of the pin is free of pin when the pin is determined to be a fat pin, and allowing a wire to be added on the associated patterning track when the associated patterning track is determined to be free of pin.

The network interface 73 is configured to access program instructions and data accessed by the program instructions stored remotely through a network (not shown).

The I/O device 75 includes an input device and an output device configured for enabling user interaction with the system 700. In some embodiments, the input device comprises, for example, a keyboard, a mouse, and other devices. Moreover, the output device comprises, for example, a display, a printer, and other devices.

The storage device 77 is configured for storing program instructions and data accessed by the program instructions. In some embodiments, the storage device 77 comprises, for example, a magnetic disk and an optical disk.

The memory 79 is configured to store program instructions to be executed by the processor 71 and data accessed by the program instructions. In some embodiments, the memory 79 comprises a random access memory (RAM) and/or some other volatile storage device and/or read only memory (ROM) and/or some other non-volatile storage device.

In some embodiments, the present disclosure provides a computer readable storage medium encoded with program instructions, wherein, when the program instructions is executed by at least one processor, the at least one processor performs a method. The method includes selecting a cell, determining whether a first pin access of a first pin and a second pin access of a second pin disposed adjacent to the first pin in the cell are on a same patterning track, separating the first pin and the second pin from each other by a first predetermined distance when the first pin access and the second pin access are determined to not be on a same patterning track, determining whether a third pin access of a third pin and a fourth pin access of a fourth pin disposed adjacent to the third pin in the cell are on a same patterning track, separating the third pin and the fourth pin from each other by a second predetermined distance when the third pin access and the fourth pin access are determined to not be on a same patterning track, the second predetermined distance being less than the first predetermined distance, and causing an integrated circuit to be fabricated according to the first pin, the second pin, the third pin and the fourth pin.

In some embodiments, the present disclosure also provides a computer readable storage medium encoded with program instructions, wherein, when the program instructions is executed by at least one processor, the at least one processor performs a method. The method includes selecting a cell, determining whether a pin has an area smaller than a predetermined area, allowing a pin access of the pin to extend in a corresponding patterning track of the pin access when the pin access when the pin is determined to be having an area smaller than the predetermined threshold, and causing an integrated circuit to be fabricated according to the pin.

In some embodiments, the present disclosure provides a system including one or more processors and a computer readable storage medium encoded with program instructions which, when the program is executed by the one or more processors, the program instructions cause the system to select a cell, determine whether a first pin access of a first pin and a second pin access of a second pin disposed adjacent to the first pin in the cell are on a same patterning track, separate the first pin and the second pin from each other by a first predetermined distance when the first pin access and the second pin recess are determined to not be on a same patterning track, determine whether a third pin access of a third pin and a fourth pin access of a fourth pin disposed adjacent to the third pin in the cell are on a same patterning track, and separate the third pin and the fourth pin from each other by a second predetermined distance when the third pin access and the fourth pin access are determined to be on a same patterning track, the second predetermined distance being less than the first predetermined distance, and cause an integrated circuit to be fabricated according to the first pin, the second pin, the third pin and the fourth pin.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer readable storage medium encoded with program instructions, wherein, when the program instructions is executed by at least one processor, the at least one processor performs a method comprising the steps of:
   selecting a cell;
   determining whether a first pin access of a first pin and a second pin access of a second pin disposed adjacent to the first pin in the cell are on a same patterning track, wherein the patterning track extends along a first direction;
   separating the first pin and the second pin from each other along a second direction by a first predetermined distance when the first pin access and the second pin access are determined to not be on a same patterning track;
   determining whether a third pin access of a third pin and a fourth pin access of a fourth pin disposed adjacent to the third pin in the cell are on a same patterning track extending along the first direction;
   separating the third pin and the fourth pin from each other along the second direction by a second predetermined distance when the third pin access and the fourth pin access are determined to be on a same patterning track, the second predetermined distance being less than the first predetermined distance; and
   causing an integrated circuit to be fabricated according to the first pin, the second pin, the third pin, and the fourth pin,
   wherein the second direction is parallel with the first direction.

2. The method according to claim 1, further comprising:
   determining whether the first pin, the second pin, the third pin or the fourth pin extends along a single patterning track; and
   determining the first pin, the second pin, the third pin or the fourth pin to be a cross-track pin when the first pin, the second pin, the third pin or the fourth pin is determined to be extending across more than one patterning tracks.

3. The method according to claim 2 further comprising:
   determining whether the first pin, the second pin, the third pin or the fourth pin has a width greater than a first threshold when the first pin, the second pin, the third pin or the fourth pin is determined to be extending along a single patterning track;
   determining the first pin, the second pin, the third pin or the fourth pin to be a fat pin when the first pin, the second pin, the third pin or the fourth pin is determined to be having a width greater than the first threshold; and
   determining the first pin, the second pin, the third pin or the fourth pin to be a short pin when the first pin, the second pin, the third pin or the fourth pin is determined to be having a width less than the first threshold.

4. The method according to claim 3 further comprising:
   determining whether a patterning track associated with the first pin access, the second pin access, the third pin access or the fourth pin access is free of pin when the first pin, the second pin, the third pin or the fourth pin is determined to be a fat pin; and
   allowing a wire to be added on the associated patterning track when the associated patterning track is determined to be free of pin.

5. The method according to claim 4 further comprising:
   adding a wire on the associated patterning track in a placement and routing process.

6. The method according to claim 3 further comprising:
   determining whether the first pin, the second pin, the third pin or the fourth pin has an area smaller than a second threshold when the first pin, the second pin, the third pin or the fourth pin is determined to be a fat pin; and
   allowing the first pin access, the second pin access, the third pin access or the fourth pin access to extend in its patterning track when the first pin, the second pin, the third pin or the fourth pin is determined to be having an area smaller than a second threshold.

7. The method according to claim 6 further comprising:
   extending the first pin access, the second pin access, the third pin access or the fourth pin access in a placement and routing process.

8. The method according to claim 1, wherein each of the first pin, the second pin, the third pin and the fourth pin is determined to be one of a cross-track pin, a fat pin or a short pin.

9. The method according to claim 1 further comprising:
   generating a pin layout; and
   storing the generated pin layout to a library.

10. A computer readable storage medium encoded with program instructions, wherein, when the program instructions is executed by at least one processor, the at least one processor performs a method comprising the steps of:
    selecting a cell;
    determining whether a pin has an area smaller than a predetermined area;
    allowing a pin access of the pin to extend in a corresponding patterning track of the pin access when the pin is determined to be having an area smaller than the predetermined threshold; and
    causing an integrated circuit to be fabricated according to the pin.

11. The method according to claim 10, wherein determining a type of the pin comprises:
    determining whether the pin extends along a single patterning track; and
    determining the pin to be a cross-track pin when the pin is determined to be extending across more than one patterning tracks.

12. The method according to claim 11 further comprising:
determining whether the pin has a width greater than a predetermined width when the pin is determined to be extending along a single patterning track;
determining the pin to be a fat pin when the pin is determined to be having a width greater than the predetermined width; and
determining the pin to be a short pin when the pin is determined to be having a width smaller than the predetermined width.

13. The method according to claim 10 further comprising:
assigning a first pin access and a second pin access of the pin to a same patterning group at different patterning tracks when the pin is determined to be a cross-track pin.

14. The method according to claim 13 further comprising:
determining whether a pin access of a first pin and a pin access of a second pin disposed adjacent to the first pin in the cell are on a same patterning track.

15. The method according to claim 14 further comprising:
separating the first pin and the second pin from each other by a first predetermined distance when the pin accesses are determined to not be on a same patterning track; and
separating the first pin and the second pin from each other by a second predetermined distance when the pin accesses are determined to be on a same patterning track, the second predetermined distance being smaller than the first predetermined distance.

16. A system, comprising one or more processors and a computer readable storage medium encoded with program instructions, wherein, when the program instructions is executed by the one or more processors, the program instructions cause the system to:
select a cell;
determine whether a first pin access of a first pin and a second pin access of a second pin disposed adjacent to the first pin in the cell are on a same patterning track, wherein the patterning track extends along a first direction;
separate the first pin and the second pin from each other along a second direction by a first predetermined distance when the first pin access and the second pin access are determined to not be on a same patterning track;
determine whether a third pin access of a third pin and a fourth pin access of a fourth pin disposed adjacent to the third pin in the cell are on a same patterning track extending along the first direction;
separate the third pin and the fourth pin from each other along the second direction by a second predetermined distance when the third pin access and the fourth pin access are determined to be on a same patterning track, the second predetermined distance being less than the first predetermined distance; and
cause an integrated circuit to be fabricated according to the first pin, the second pin, the third pin, and the fourth pin,
wherein the second direction is parallel with the first direction.

17. The system according to claim 16, further comprising instructions which, when executed by the one or more processors, cause the system to:
determine whether the first pin, the second pin, the third pin or the fourth pin extends along a single patterning track; and
determine the first pin, the second pin, the third pin or the fourth pin to be a cross-track pin when the first pin, the second pin, the third pin or the fourth pin is determined to be extending across more than one patterning tracks.

18. The system according to claim 17 further comprising instructions which, when executed by the one or more processors, cause the system to:
determine whether the first pin, the second pin, the third pin or the fourth pin has a width greater than a first threshold when the first pin, the second pin, the third pin or the fourth pin is determined to be extending along a single patterning track;
determine the first pin, the second pin, the third pin or the fourth pin to be a fat pin when the first pin, the second pin, the third pin or the fourth pin is determined to be having a width greater than the first threshold; and
determine the first pin, the second pin, the third pin or the fourth pin to be a short pin when the first pin, the second pin, the third pin or the fourth pin is determined to be having a width less than the first threshold.

19. The system according to claim 18 further comprising instructions which, when executed by the one or more processors, cause the system to:
determine whether a patterning track associated with the first pin access, the second pin access, the third pin access or the fourth pin access is free of pin when the first pin, the second pin, the third pin or the fourth pin is determined to be a fat pin; and
allow a wire to be added on the associated patterning track when the associated patterning track is determined to be free of pin.

20. The system according to claim 18 further comprising instructions which, when executed by the one or more processors, cause the system to:
determine whether the first pin, the second pin, the third pin or the fourth pin has an area smaller than a second threshold when the pin is determined to be a fat pin; and
allow a pin access of the pin to extend in its patterning track when the first pin, the second pin, the third pin or the fourth pin is determined to be having an area smaller than a second threshold.

* * * * *